United States Patent [19]
Gerstenkorn

[11] Patent Number: 5,274,312
[45] Date of Patent: Dec. 28, 1993

[54] METHOD AND APPARATUS FOR CONTROLLING A SLIDING ELEVATOR DOOR

[75] Inventor: Bernhard Gerstenkorn, Kriens, Switzerland

[73] Assignee: Inventio AG, Hergiswil NW, Switzerland

[21] Appl. No.: 996,123

[22] Filed: Dec. 23, 1992

[30] Foreign Application Priority Data

Dec. 24, 1991 [CH] Switzerland ............. 03844/91

[51] Int. Cl.$^5$ ........................... B66B 13/08
[52] U.S. Cl. ................. 318/617; 318/561; 187/103; 187/133
[58] Field of Search ............... 318/560–696, 318/260–286; 187/103, 31, 133

[56] References Cited

U.S. PATENT DOCUMENTS

| | | | |
|---|---|---|---|
| 4,299,308 | 11/1981 | Shung et al. | 187/103 |
| 4,300,660 | 11/1981 | Schoenmann et al. | 187/103 |
| 4,300,661 | 11/1981 | Hmelovsky | 187/103 |
| 4,300,662 | 11/1981 | Hmelovsky | 187/103 |
| 4,300,663 | 11/1981 | Hmelovsky et al. | 187/103 |
| 4,305,480 | 12/1981 | Hmelovsky | 187/103 |
| 4,305,481 | 12/1981 | Hmelovsky et al. | 187/103 |
| 4,342,378 | 8/1982 | Hmelovsky | 187/103 |
| 4,342,379 | 8/1982 | Games et al. | 187/103 |
| 4,449,078 | 5/1984 | Ogishi et al. | |
| 4,832,158 | 5/1989 | Farrar et al. | 187/103 |
| 5,137,118 | 8/1992 | Iwata | 187/103 |
| 5,139,113 | 8/1992 | Mizuno et al. | 187/133 X |
| 5,144,101 | 9/1992 | Tawada et al. | 187/103 |
| 5,162,711 | 11/1992 | Heckler | 318/264 |

FOREIGN PATENT DOCUMENTS 399775 9/1965 Switzerland .
2103710 2/1983 United Kingdom .

Primary Examiner—Paul Ip
Attorney, Agent, or Firm—William J. Clemens

[57] ABSTRACT

A method for controlling a sliding door system determines the masses and the frictional forces of all movably interconnected parts of the sliding door system. The system has a door leaf which is moved in an opening learning travel and a closing learning travel and guided without drive over respective first and second test sections. First and second energy balances are determined from the detected speed and distance travelled data of the first and second test sections respectively. The energy balances equate the kinetic energy at the beginning of a test section with the kinetic energy at the end of the test section plus the frictional energy plus the potential energy of a closing weight connected to the door leaf. The potential energy is added with a positive sign for opening travel and a negative sign for closing travel. The dynamic mass and the mean frictional force of the sliding door system can then be determined from the first and second energy balances. An apparatus for controlling the door motor in accordance with the method includes a microprocessor in a door drive with a memory for storing the speeds and distances associated with the learning travels. The microprocessor and the tachometer detect, store and process the speed and distance data, and the microprocessor determines the values for the dynamic mass and the mean frictional force and also the closing speed, which is the maximum permissible for safe operation of the door.

15 Claims, 3 Drawing Sheets

METHOD AND APPARATUS FOR CONTROLLING A SLIDING ELEVATOR DOOR

BACKGROUND OF THE INVENTION

The present invention relates generally to automatic door controls and, in particular, to a method and an apparatus for optimizing the performance of individual automatic sliding door systems for elevators.

Automatic sliding doors, for example of the type used in high performance elevators, must meet various operating regulations. Thus, for example, to protect against wedging, it is required that the maximum movement energy of all parts connected together mechanically may not exceed a preset maximum value (for example 10 joules) at a mean closing speed. This requirement sets an upper limit value for the mean closing speed. On the other hand, short door closing times are a prerequisite for good transport performance in high performance elevators. One is therefore forced to fully utilize the greatest possible closing speed which is still permissible while safeguarding for wedging protection and set the door drive thereto. In order to do so, however, it is necessary to know the maximum permissible closing speed.

In the case of an automatic sliding door, the maximum closing speed (vmax) is determined by the movement energy (Ekmax), which is the maximum permissible in terms of safety techniques, and the dynamic door mass (md). The equation is $vmax = 2 \cdot Ekmax/md$. Since Ekmax is preset by the safety regulations, the computation of vmax must be used to determine the dynamic door mass (md). All movable interconnected masses of the door system related to the translational movement of the door leaf to prevent wedging are considered. Belonging to this group of masses are all door leaves, coupling elements and entraining elements, movable door monitoring devices, closing weights, cable connections to the door leaves, door leaf transmissions and so forth. In that case, door fields, which move at half speeds, for example in the case of telescopic doors, have only a quarter of their static mass added into the dynamic mass. Thus, the computation is complicated and difficult and there is a requirement for a simple and exact method to be used to ascertain the dynamic mass (md) for elevator doors.

Different methods have been used to determine the dynamic mass. A first method consists of ascertaining the static masses for the individual door leaves using a weighing machine and converting the same into dynamic masses in correspondence with the drive transmissions. Additionally, a certain value for the dynamic mass of the drive system is added thereto. The result is stored permanently in the electronic door drive system. In a second method, a special mass system is used, which is incorporated in each door system and ascertains the dynamic door masses automatically. A further method examines the system behavior of door systems for different known dynamic door masses. The results are stored in the door drive software and the dynamic door masses of any desired door systems are ascertained therefrom.

All these methods have the disadvantage that they require complicated and expensive equipment and are moreover sensitive to outside interferences as well as being inaccurate.

On the other hand, a method and an apparatus are shown in the Swiss CH patent document 339 775 for measuring the loading torque in the case of electrical drives, in particular in conveying drives. This method sets the drive motor at zero torque for at least a short time in an operating instant provided for the measurement. The acceleration or retardation which appears at the drive machine in this operating state is a direct measure of the loading torque engaging the drive machine. For ascertaining the acceleration or retardation, the speed of the drive machine is measured at the beginning and at the end of a predetermined time interval, and both the of the measurement values are stored in a memory and the difference of both the measurement values is indicated in a display device. This method consists substantially of letting the electrical drive traverse a test section without driving and measuring the arising acceleration or retardation. The equipment for performing this method consists of the combination of a device for switching the motor torque off and a device for measuring the acceleration or retardation. The device for switching the motor torque off is constructed as a relay for the interruption of the electrical power feed to the drive machine, while the device for measuring the acceleration or retardation comprises a pulse generator which is coupled with the drive machine and generates pulses at a repetition frequency proportional to its rotational speed.

The basic disadvantage of this method is in that the loading torque cannot be ascertained absolutely, but only by a proportionality constant. The aforementioned course of movement over a test section leads to an equation $K = md \cdot a$ with the measured acceleration (a) known and the force (K) as well as the dynamic mass (md) unknown. In order to determine both of the unknowns K and md, a second independent equation from a second test run would be required. The safety requirement however does not provide for making two such test runs each independent of the other in order that both of the corresponding equations are likewise independent and can be solved for both of the unknowns K and md. It also has proved to be disadvantageous that the measured acceleration or retardation (a) represents only "a measure" for the sought loading torque at the drive machine and therefore can be ascertained only inaccurately. Its use, for example for the control of the onset of braking or the braking torque, is therefore limited by the accuracy. This is the case particularly for drives for elevators of lightweight construction, since the dynamic mass (md) serving as the proportionality constant is in this case determined to an increased degree by the load to be conveyed and therefore not only unknown, but also rapidly variable. Furthermore, a basic defect is that the frictional force present in an electrical drive is a part of the loading torque to be ascertained and cannot be ascertained separately. This makes the numerical ascertaining of actually present frictional conditions impossible and thereby precludes their monitoring for precautionary maintenance as well as their comparison for quality assurance.

SUMMARY OF THE INVENTION

The present invention concerns a method and an apparatus for ascertaining the dynamic mass and mean frictional force of an elevator door to permit the optimal control of an automatic sliding door system. The method includes subjecting the system to at least one travel without drive having a test section and in which at least one further parameter characterizing the mass system is computed from kinematic parameters measured during that travel. The corresponding kinetic energy, which would become effective in the case of wedging-in at the closing edge of the door, can be ascertained for elevator doors for each closing speed. Conversely, it is possible to ascertain the corresponding closing speed for a given closing energy which is the maximum permissible in terms of safety and to set the door drive thereto. Generally, the method is suitable for the numerical ascertaining of system parameters which are of significance, for example for optimizing performance or precautionary maintenance of a mass system.

The method according to the present invention determines a dynamic mass and a mean frictional force of a sliding elevator door, the door having at least one door leaf coupled to a door motor for driving the leaf between an open position and a closed position, a door drive including the door motor for controlling a driving force applied by the motor to the door leaf, and an emergency closing device including a closing weight connected to the door leaf. The method includes the steps of moving a door leaf of a sliding door system in an opening learning travel by switching on a door motor coupled to the door leaf and accelerating the door leaf from a closed position to a predetermined opening speed, and switching the door motor off at said predetermined opening speed; detecting and storing a first speed and a first travel point of the door leaf at a beginning of a first test section and a second speed and a second travel point at an end of said first test section, the first test section beginning after the door motor is switched off; switching on the door motor to open the door leaf completely; moving the door leaf in a closing learning travel by switching on the door motor and accelerating the door leaf from an open position to a predetermined closing speed, and switching the door motor off at the predetermined closing speed; detecting and storing a third speed and a first travel point of the door leaf at a beginning of a second test section and a fourth speed and a second travel point at an end of the second test section, the second test section beginning after the door motor is switched off; and switching on the door motor to close the door leaf completely. The method also includes the steps of determining a first energy balance of the sliding door system wherein a kinetic energy at the beginning of the first test section is equal to a kinetic energy at the end of the first test section plus a frictional energy generated by movement of the door leaf through the first test section plus a potential energy gained by a closing weight connected to the door leaf by movement of the door leaf through the first test section; determining a second energy balance of the sliding door system wherein a kinetic energy at the beginning of the second test section is equal to a kinetic energy at the end of the second test section plus a frictional energy generated by movement of the door leaf through the second test section minus a potential energy lost by the closing weight connected to the door leaf by movement of the door leaf through the second test section; and combining the first and second energy balances and determining values for a dynamic mass and a mean frictional force for the sliding door system.

The apparatus for controlling the door motor in accordance with the above described method includes a microprocessor for controlling a door motor coupled to a door leaf of a sliding door system, the door motor driving the door leaf between an open position and a closed position, the microprocessor having an input for receiving a door motor speed signal from a tachometer coupled to the door motor; and a memory in the microprocessor responsive to the door motor speed signal for storing values of speeds and distances associated with a learning travel of the door leaf through a test section between the open position and the closed position of the door leaf. The microprocessor and tachometer can be devices which are provided in the existing door drive of the sliding door system.

Accordingly, it is an object of the present invention to provide a method and an apparatus for ascertaining the characterizing kinematic parameters with high accuracy in systems of movably interconnected mass parts. The method and the apparatus shall in particular enable the dynamic mass and the mean frictional force of all movably interconnected parts to be ascertained numerically for sliding door systems for elevators and to do this at any time during the normal elevator operation and without the use of any special additional measuring equipment.

A advantage results from the circumstance that the elevator door is installed in its natural environment and fully capable of operation during the experimental ascertaining of the door parameters and that the learning travels used in that case differ only insubstantially from a normal opening or closing movement. For that reason, those values are ascertained which also actually arise in normal operation of the elevator door for the individual door parameters. It is furthermore of advantage that the method is realized through utilization of the already present door drive. Thus, no special equipment is required which could be a source of errors, and the already present door drive is used for a new purpose, for which it was not provided originally. In addition, there is only one algorithm corresponding to the method and that can easily be implemented in the existing microprocessor system of the door drive.

It also has been proved that the method according to the present invention can easily be integrated in existing elevator controls, for example by way of a data-collecting bus. Accordingly, the invention is imminently suitable for expanding conventional door drives in terms of safety technique and thereby to make them subsequently secure in their operating behavior and comfortable in maintenance.

A further advantage is in that the method is suitable for detecting physical characteristic magnitudes in real time, evaluate them statistically and to record them and to do this as normal interruptions of the superordinate elevator operation. Such statistics are suitable for direct evaluation for precautionary maintenance and quality assurance, as well as proof of safe operation for inspectors.

The invention is explained below in its application for the ascertaining of the dynamic mass and the mean frictional force of a sliding elevator door with the aid of the description as well as the drawings, but the method shown here is generally applicable when it is required to ascertain the characterizing parameters in a system of movably interconnected mass parts.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
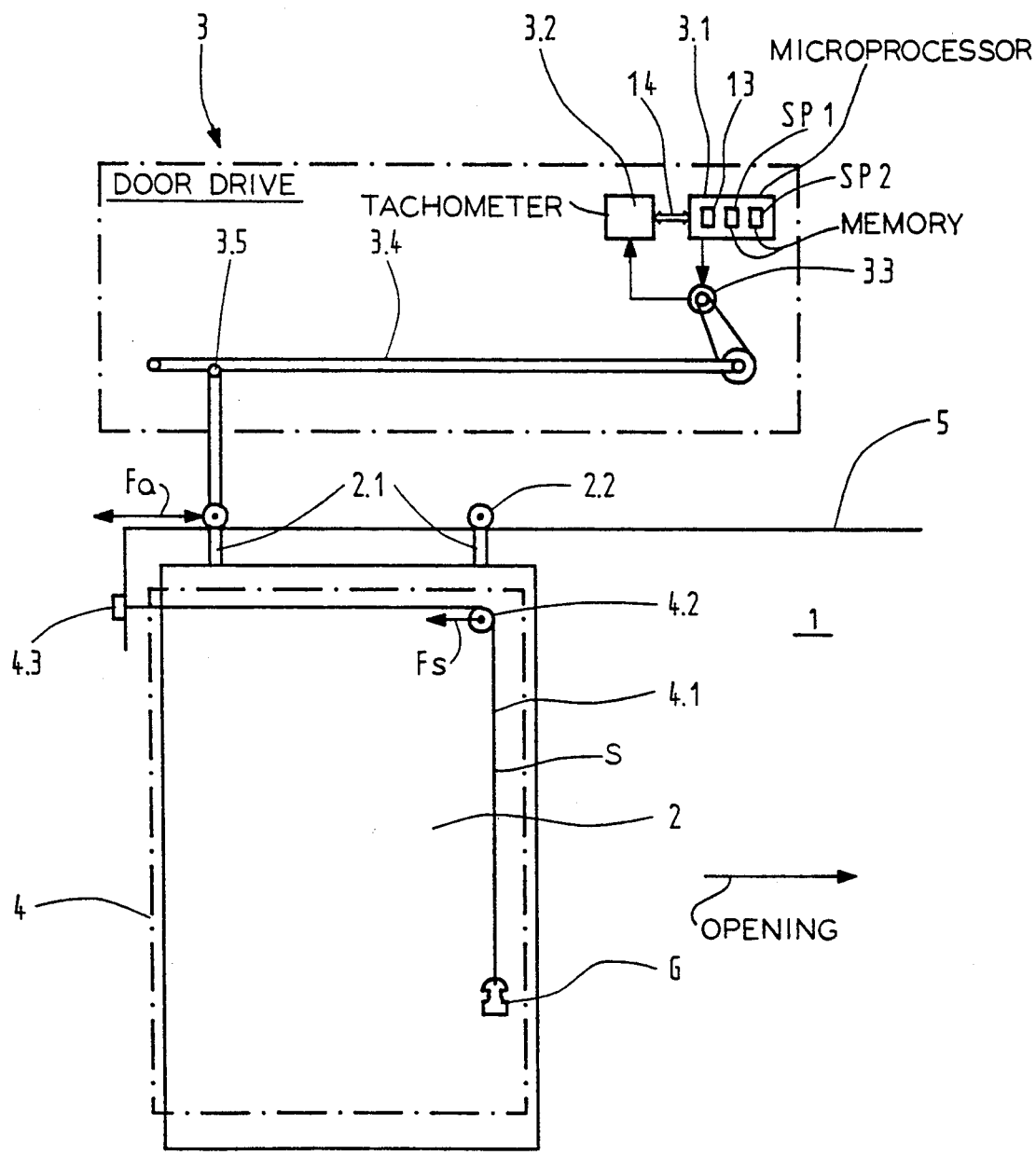
FIG. 1 is a schematic diagram of a sliding door system for elevator cars including an apparatus in accordance with the present invention for controlling the door motor driving a door leaf.

There is shown in the FIG. 1, a mass system for which the physical characteristic magnitudes are to be ascertained. The system is represented by an automatic sliding door system 1 for a elevator car, which system is constructed substantially in accordance with known systems currently in use. A door drive for an elevator car is connected directly with an associated sliding car door and, by way of a coupling mechanism, with the sliding shaft door at a floor served by the car. Although elevator cars can have two or more door leaves, only one of the sliding door leaves is illustrated for the sake of simplicity. The present invention concerns a method and an apparatus for ascertaining the dynamic mass (md) and the mean frictional force (Fr*) of the sliding door system 1.

The automatic sliding door system 1 is shown in the FIG. 1 in front elevation and includes a door leaf 2, a door drive 3 and an emergency closing device 4 with a closing weight G. The door leaf 2 is guided in horizontally displacement along a running rail 5 from which the door leaf 2 is suspended at an upper edge by hangers 2.1 which are attached to rollers 2.2. A lower edge of the door leaf 2 runs with relatively low friction in a corresponding guide of a fixed floor threshold (not shown). Even though only one door leaf 2 is mentioned in the following description for the sake of simplicity, it is however self-evident that the same arrangement is also usable for multimembered door leaves.

The door drive 3 includes a microprocessor 3.1, an tachometer 3.2 and a door motor 3.3. The driving force Fa generated by the door drive is applied to both open and close the door leaf 2 as represented by a double headed arrow. The driving force Fa is generated at an output of the motor 3.3 which is connected by a cable pull 3.4 and an entraining member 3.5 to the door leaf 2 in order to open or close the same. The tachometer 3.2 is coupled to the door motor 3.3 or to any desired other point within the door drive 3 to generate a pulsed signal proportional to the door leaf speed representing increments of distance travelled by the door 2 on a real time basis. The pulsed signal is generated at an output connected by a data bus 14 to an input of the microprocessor 3.1. The mircoprocessor 3.1 includes a scanner 13 for detecting the pulsed signal and a first memory SP1 and a second memory SP2. The scanner 13 periodically reads the pulsed data from the tachometer 3.2 and this data representing the speed versus the distance travelled is stored in the first memory SP1. Data representing the beginning and ending speeds and the length of opening and closing learning travels of the door leaf 2 are stored in the second memory SP2.

The emergency closing device 4 is significant for the method according to the present invention. The device 4 includes a closing weight G having a mass (mG), which weight is connected by a cable 4.1, running over a guide roller 4.2 rotatably mounted on the door leaf 2, with a fastening point 4.3 in the elevator shaft and hangs freely. By reason of this arrangement, a closing weight force Fs equal to mass times gravity (mG·g) is applied to the door leaf 2. This closing weight force Fs acts permanently and in the closing direction for all door positions and, in the case of emergency, will automatically close the door leaf 2. Such emergency closing devices 4 are required according to the relevant safety regulations in order that the shaft door leaves close automatically in the case of a fault and secure the elevator shaft. Sliding doors for high performance elevators are therefore equipped with closing weights G.

In order that the function of the emergency closing device 4 is assured for all frictional conditions, the closing weight force Fs must be greater than the maximum static frictional force (Fhmax) arising for every possible position of the door leaf 2. In normal operation, the door leaf 2 is opened and closed through horizontal displacement by means of the door drive 3, for which the closing weight force Fs during opening counteracts the driving force Fa and during closing is in the same direction as the driving force.

Figure 2A:
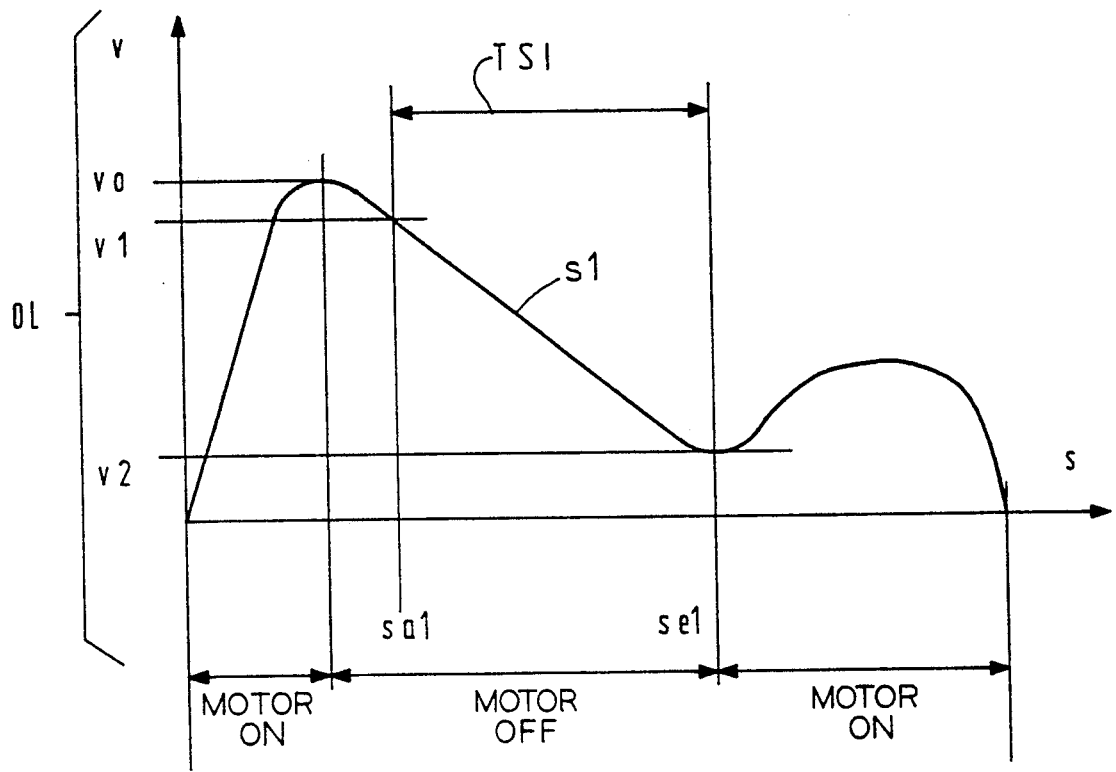
FIG. 2a is speed-travel curve for the opening learning travel of the sliding door system shown in the FIG. 1.
Figure 2B:
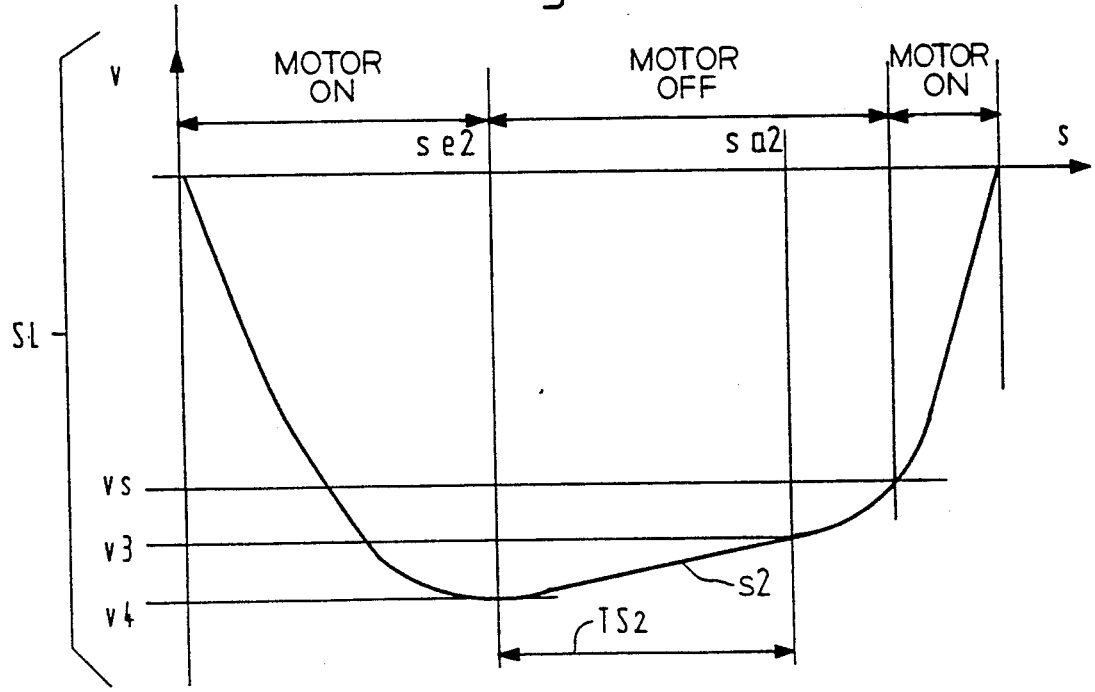
FIG. 2b is speed-travel curve for the closing learning travel of the sliding door system shown in the FIG. 1.

In the FIGS. 2a and 2b, an opening learning travel curve OL and a closing learning travel curve SL, respectively, are shown as they are used for the experimental ascertaining of the dynamic mass (md) and the mean frictional force (Fr*) of the sliding door system 1 for an elevator car. Each curve is plotted against as a respective speedtravel diagram with the distance travelled (s) on the horizontal axis and speed (v) on the vertical axis. In the FIG. 2a, the door drive 3 is switched on and the door leaf 2 is accelerated from the closed state at zero distance and zero speed to an opening speed vo. The door drive 3 is then switched off and momentum moves the door leaf 2 into a first test section TS1 at a first or entry travel point sa1 with the door drive motor current at zero and at a first speed v1. The door leaf 2 travels the test section TS1 with reducing speed while the door drive 3 is switched off, but subject to braking by the closing weight G. After traversing a first travel path s1, the door leaf 2 exits the first test section TS1 at a second or exit travel point se1 and at a positive second speed v2. At the second travel point se, reactivation of the door drive 3 takes place in order to open the door leaf 2 completely at which time the door leaf speed again is zero.

The purpose of the opening learning travel OL is the parametric characterization of the opening movement which is free, but braked by the closing weight G. The door leaf first and second speeds v1 and v2, as well as the travel path s1, are measured by the tachometer 3.2 and stored in the first memory SP1 of the microprocessor 3.1 for later use.

The corresponding closing learning travel SL is illustrated as a speed-travel curve in the FIG. 2b. In that case, the door leaf 2 is accelerated out of the closed state to a closing speed vs and the door drive 3 is switched off. Momentum and the closing weight move the door leaf into a second test section TS2 at a first or entry travel point sa2 and at a third speed v3. The door leaf 2 moves through the second test section TS2 with the door drive 3 switched off, but subject to driving by the closing weight G, at constant or increasing speed. After traversing a second travel path s2, the door leaf 2 exits the second test section TS2 at a second or exit travel point se at a still negative fourth speed v4. At the second travel point se2, the door drive 3 is switched on in order to close the door leaf 2 completely.

The purpose of the closing learning travel SL, is likewise the parametric characterization of the closing movement which is free, but driven by the closing weight G. For this purpose, the door leaf third speed v3 and fourth speed v4 are measured with by the tachometer 3.2 and stored in the second memory SP2 in the microprocessor 3.1 of the door drive 3 for later use. Since a sliding door system 1 is being used in this example of an application of the present invention, the door leaf speeds v1, v2, v3 and v4 are translational speeds.

Figure 3:
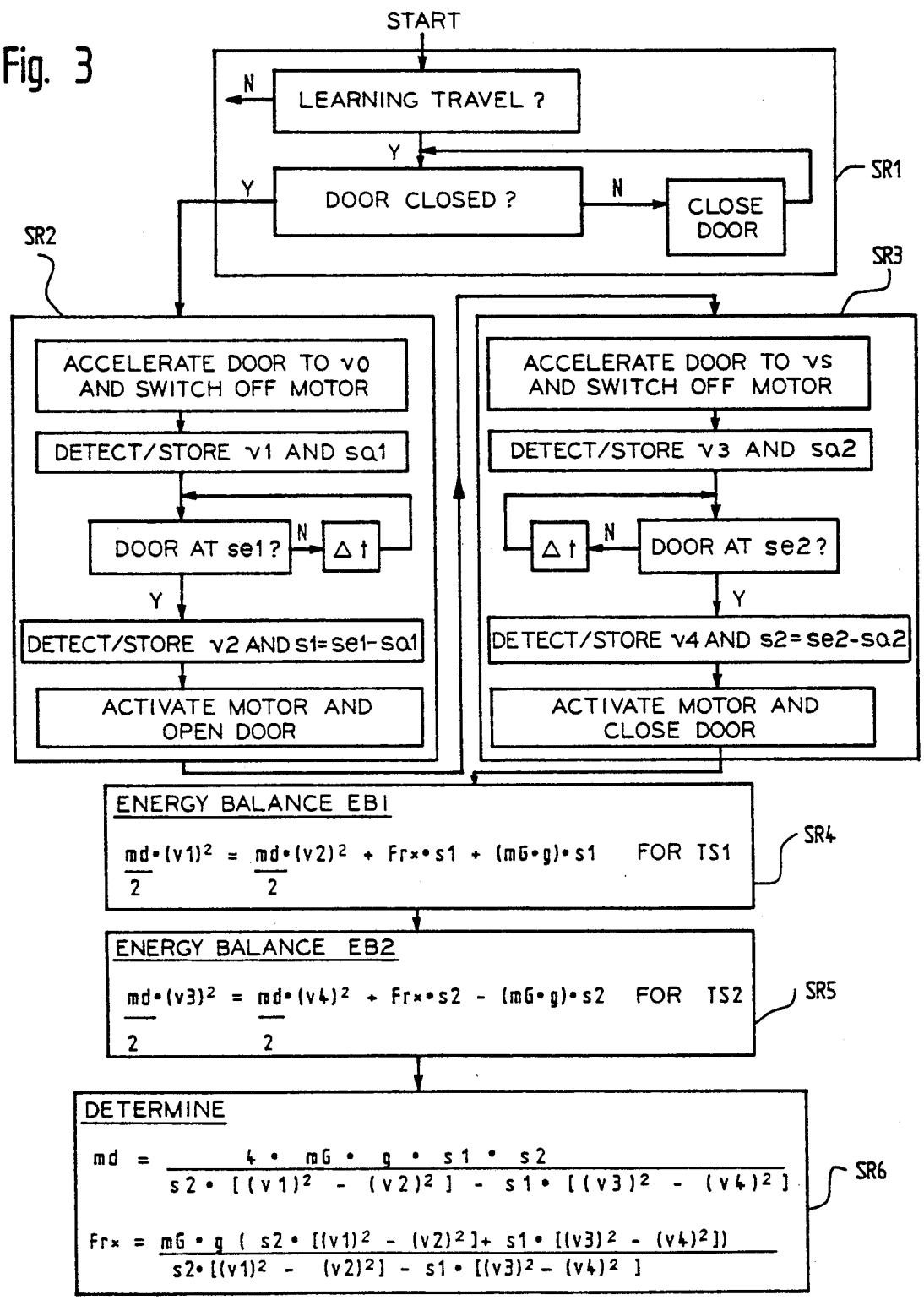
FIG. 3 is a flow diagram of the method according to the present invention for controlling the sliding door system shown in the FIG. 1.

The method according to the present invention is explained in detail with the aid of the FIG. 3. The method can be implemented as a computer program stored in and executed by the microprocessor 3.1 of the door drive 3 and is illustrated in the form of a flow diagram. Control of a sliding door system for elevator cars requires that the potential energy (Ep) of the closing weight G as well as the kinetic energy (Ek) and the frictional energy (Er) of all system parts be taken into consideration in the calculation of energy and that the dynamic mass (md) and the mean frictional force (Fr*) are the physical characteristic magnitudes to be ascertained. In the flow diagram of the FIG. 3, the method steps forming the basis of the invention begin at a point (START) and it is presupposed that the opening direction and the door width have already been ascertained and are thus known.

The program enters a first step SR1 having an instruction by which it is made certain that learning travels are to be measured and stored (LEARNING TRAVEL ?). If the method is not to be performed (N), the program exits the step SR1. If the learning travel door movements are to be measured (Y), the program exits the instruction and enters an instruction to determine if the door leaf 2 is disposed in the completely closed state (DOOR CLOSED ?). If the door is not closed (N), the program exits to a command instruction (CLOSE DOOR) and back to the instruction (DOOR CLOSED ?) and will continue to loop until the door closes. If the door is closed (Y), the program enters a second step SR2.

During the first learning travel, the opening learning travel OL is determined as illustrated in the step SR2. For this purpose, the program enters a command instruction (ACCELERATE DOOR TO vo AND SWITCH OFF MOTOR) whereby the door leaf 2 is accelerated out of the closed state to the positive opening speed vo and the door drive 3 is then switched off. In that case, vo is so chosen so that, subject to friction and the closing weight force Fs, the first test section TS1 is traversed to its end point at a diminishing, but still positive speed. After the motor current is zero, the program enters a command instruction (DETECT/STORE v1 AND sa1) whereby the door leaf first speed v1 and the corresponding door leaf entry travel point sa1 are detected at the beginning of the test section TS1 and stored. The program enters instruction (DOOR AT se1 ?). If the door leaf has not reached the exit point (N), the program exits to a time increment instruction ($\Delta t$) and checks the door leaf position after a time delay. When the door leaf moves to the exit travel point se1 at the end of the test section TS1 (Y), the program enters a command instruction (DETECT/STORE v2 and s1=se1−sa1) whereby the traversed first travel path (s1=se1−sa1) as well as the second speed v2 are detected at the position se1 and stored. Thereafter, the program enters a command instruction (ACTIVATE MOTOR AND OPEN DOOR) whereby the door drive 3 is activated again in order to open the door completely. The microprocessor 3.1 and the tachometer 3.2 in the door drive 3 measure the door leaf speeds v1 and v2 as well as the length s1 of the test section TS1 which data is stored in the first memory SP1. Since these devices typically are provided in a sliding door system, no additional measuring equipment is needed which could be a source of errors.

After the opening learning travel OL has been completed, the closing learning travel SL takes place in a third step SR3 which is similar to the second step SR2. In that case, the door leaf 2 is accelerated out of the opened state to the negative closing speed vs and the door drive 3 is then switched off. The closing speed vs is chosen so that, subject to friction and the closing weight force, the second test section TS2 is traversed without the door motor to its end with a negative and generally variable speed. After the motor current is zero, the third speed v3 and the corresponding first travel point sa2 are detected at the beginning of the second test section TS2 and stored. The door leaf is moved to the second travel point se2 at the end of the second test section TS2 and the traversed second travel path (s2=se2−sa2) as well as the corresponding fourth speed v4 are detected at the exit travel point se2 and stored. Thereafter, the door drive 3 is activated again in order to close the door completely. Again, the door leaf speeds v3 and v4, at the beginning and at the end respectively of the test section TS2, are detected and stored as well as the length of the second travel path s2 with the aid of the microprocessor 3.1 and the tachometer 3.2.

The following steps SR4 and SR5 serve to establish energy balances EB1 and EB2 respectively for the first test section TS1 and the second test section TS2. In that case, the method uses the physical law that the total energy is constant in a system closed in terms of energy. This applies in our example for the movement through both of the test sections TS1 and TS2 since the door drive 3 is switched off during the traversing of these test sections and energy can neither be added to nor withdrawn from the sliding door system 1 during these times. The change in the kinetic energy (Ek), ascertained by the change in the speed of the door leaf 2, is brought about through the conversion of kinetic energy (Ek) into frictional energy (Er) and potential energy (Ep). Clearly, according to the method of the present invention, not just any closing weight G is used, but an exactly defined one, the mass (mG) of which is known. It is presupposed in that a mass (mS) of a cable piece S (FIG. 1) between the closing weight G and the guide roller 4.2 is negligibly small with respect to the mass (mG) of the closing weight G. If this is not true, the cable mass (mS) must be included in the computation by adding it to the mass (mG) of the closing weight G. Since the cable mass (mS) between the guide roller 4.2 and the closing weight G is variable during the traversing of the test sections TS1 and TS2, the mean cable length is included in the computation. The mean cable length is the length (l1) of the cable piece S when the door is at the beginning of a test section added to the length (l2) of the cable piece when the door is at the end of the same test section and the total divided by two:

mean cable length = (l1+l2)/2.

Furthermore, the gravitational acceleration (g) is known as a natural constant. In order to eliminate any error due to the positional dependence of the frictional force, the first test section TS1 and the second test section TS2 are located on the same portion of the running rail 5. Thus, the beginning and the end of the first test section are the end and the beginning respectively of the second test section. In order to eliminate any error due to the positional dependence of the frictional force, the speeds v1, v2, v3 and v4 are chosen according to the relationship:

$$v3 = (v1+v2)/2 \approx v4.$$

The first energy balance (EB1) for the first test section TS1 is therefore established in the fourth step SR4 on the basis of the magnitudes measured and stored in the second step SR2, namely the door leaf speeds v1 and v2 as well as the travel path s1. It is significant that the potential energy (Ep) of the closing weight G increases over the test section TS1 and that this energy increase is entered with a positive sign into the equation for the first energy balance EB1. Thus, for EB1, the kinetic energy (Ek) at the start of the test section TS1 equals the sum of the kinetic energy (Ek), the frictional energy (Er) and the potential energy (Ep) at the end of the test section TS1.

$$(md/2) \cdot (v1)^2 = (md/2) \cdot (v2)^2 + (Fr^*) \cdot (s1) + (mG \cdot g) \cdot (s1) \quad \text{EB1}$$

In analogous manner, the second energy balance (EB2) for the second test section TS2 is established in the step SR5, wherein the potential energy (Ep) of the closing weight G decreases over the test section TS1 and this energy reduction is entered with a negative sign into the equation for the second energy balance (EB2).

$$(md/2) \cdot (v3)^2 = (md/2) \cdot (v4)^2 + (Fr^*) \cdot (s2) - (mG \cdot g) \cdot (s2) \quad \text{EB2}$$

Finally, the formulae for ascertaining the dynamic mass (md) as well as the mean frictional force (Fr*) are shown in a sixth or last step SR6. Both the energy balances (EB1 and EB2) represent equations which, because of the different effect of the closing weight during the opening and closing of the door leaf, are completely independent from one another and, accordingly, can be solved for the dynamic mass (md) and the frictional force (Fr*).

If $A = s2 \cdot ((v1)^2 - (v2)^2)$ and $B = s1 \cdot ((v3)^2 - (v4)^2)$, then $$md = (4 \cdot mG \cdot g \cdot s1 \cdot s2)/(A-B)$$

$$Fr^* = mG \cdot g \cdot (A+B)/(A-B)$$

A maximum closing speed (vmax), which is the maximum permissible for reasons of safety, for the door leaf 2 of the sliding door system 1 results from the dynamic mass (md) and is calculated as follows:

$$vmax = \sqrt{C}$$

wherein $C = 2 \cdot W/md$ and the maximum closing energy (W) is the maximum permissible for reasons of safety.

The method and apparatus according to the present invention are not restricted to the above described example. In particular, the present invention also is generally suitable for vertical sliding doors or for pivoting doors. In these cases, the dynamic mass as well as the mean frictional force of all installation parts are referred to the vertical translation movement or to the rotational movement of the door leaf. Furthermore, other kinds of energy can be included in the energy balance equations and other physical characteristic magnitudes can be ascertained therefrom.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for controlling a sliding elevator door, the door having at least one door leaf coupled to a door motor for driving the leaf between an open position and a closed position, a door drive including the door motor for controlling a driving force applied by the motor to the door leaf, and an emergency closing device including a closing weight connected to the door leaf, comprising the steps:

a) moving a door leaf of a sliding door system in an opening learning travel by switching on a door motor coupled to the door leaf and accelerating the door leaf from a closed position to a predetermined opening speed, and switching the door motor off at said predetermined opening speed;

b) detecting and storing a first speed and a first travel point of the door leaf at a beginning of a first test section and a second speed and a second travel point at an end of said first test section, said first test section beginning after the door motor is switched off;

c) switching on the door motor to open the door leaf completely;

d) moving the door leaf in a closing learning travel by switching on the door motor and accelerating the door leaf from an open position to a predetermined closing speed, and switching the door motor off at said predetermined closing speed;

e) detecting and storing a third speed and a first travel point of the door leaf at a beginning of a second test section and fourth speed and a second travel point at an end of said second test section, said second test section beginning after the door motor is switched off;

f) switching on the door motor to close the door leaf completely;

g) determining a first energy balance of the sliding door system wherein a kinetic energy at the beginning of said first test section is equal to a kinetic energy at the end of said first test section plus a frictional energy generated by movement of the door leaf through said first test section plus a potential energy gained by a closing weight connected to the door leaf by movement of the door leaf through said first test section;

b) determining a second energy balance of the sliding door system wherein a kinetic energy at the beginning of said second test section is equal to a kinetic energy at the end of said second test section plus a frictional energy generated by movement of the door leaf through said second test section minus a potential energy lost by the closing weight connected to the door leaf by movement of the door leaf through said second test section; and i) determining values for a dynamic mass and a mean frictional force for the sliding door system from said first and second energy balances.

2. The method according to claim 1 wherein said step g) is performed by determining said first energy balance according to an energy relationship represented by
$(md/2)\cdot(v1)^2 = (md/2)\cdot(v2)^2 + (Fr^*)\cdot(s1) + (mG\cdot g)\cdot(s1)$
and said step h) is performed by determining said second energy balance according to an energy relationship represented by
$(md/2)\cdot(v3)^2 = (md/2)\cdot(v4)^2 + (Fr^*)\cdot(s2) - (mG\cdot g)\cdot(s2)$
wherein:

$(md/2)\cdot(v1)^2$ is said kinetic energy at the beginning of said first test section, $(md/2)\cdot(v2)^2$ is said kinetic energy at the end of said first test section, $(Fr^*)\cdot(s1)$ is said mean frictional force in said first test section, $(mG\cdot g)\cdot(s1)$ is said potential energy gained in said first test section, $(md/2)\cdot(v3)^2$ is said kinetic energy at the beginning of said second test section, $(md/2)\cdot(v4)^2$ is said kinetic energy at the end of said second test section, $(Fr^*)\cdot(s2)$ is said mean frictional force in said second test section, $(mG\cdot g)\cdot(s2)$ is said potential energy lost in said second test section, md is said dynamic mass of the sliding door system, v1 is said first speed at the beginning of said first test section, v2 is said second speed at the end of said first test section, s1 is a distance travelled in said first test section, $Fr^*$ is said mean frictional force of the sliding door system, mG is a mass of the closing weight, g is gravitational acceleration, v3 is said third speed at the beginning of said second test section, v4 is said fourth speed at the end of said second test section, and s2 is a distance travelled in said second test section.

3. The method according to claim 2 wherein said step i) is performed by determining said values of said dynamic mass (md) and said mean frictional force ($Fr^*$) according to relationships:

$md = (4\cdot mG\cdot g\cdot s1\cdot s2)/(A-B)$ and
$Fr^* = mG\cdot g\cdot(A+B)/(A-B)$, wherein $A = s2\cdot((v1)^2 - (v2)^2)$ and $B = s1\cdot((v3)^2 - (v4)^2)$.

4. The method according to claim 1 wherein the closing weight is connected to a fastening point by a cable extending over a guide roller rotatably attached to the door leaf and said steps g) and h) include adding a mass of a cable piece of said cable extending between the closing weight and the guide roller to said mass of the closing weight (mG), said mass of the cable piece being calculated using a mean cable length according to a relationship:

mean cable length $= (l1 + l2)/2$, wherein l1 is a length of the cable piece between the closing weight and the guide roller at the beginning of one of said first and second test sections and l2 is a length of the cable piece between the closing weight and the guide roller at the end of said one of said first and second test sections.

5. The method according to claim 1 wherein said closing weight is selected to generate a closing weight force on the door leaf approximately twice a maximum static friction force (Fhmax) according to relationship $mG\cdot g \approx 2\cdot Fhmax$.

6. The method according to claim 1 wherein said beginning and said end of said first test section are said end and said beginning respectively of said second test section.

7. The method according to claim 1 wherein said first, second, third and fourth speeds are selected according to a relationship: $v3 = (v1+v2)/2 \approx v4$.

8. The method according to claim 1 wherein a maximum permissible closing speed (vmax) of the door leaf is determined according to a relationship:

$$vmax = \sqrt{C},$$

wherein $C = 2\cdot W/md$ and a maximum closing energy (W) has a value which is a maximum permissible safe value.

9. A method for controlling a sliding elevator door, the door having at least one door leaf coupled to a door motor for driving the leaf between an open position and a closed position, a door drive including the door motor for controlling a driving force applied by the motor to the door leaf, and an emergency closing device including a closing weight connected to the door leaf, comprising the steps:

a) moving a door leaf of a sliding door system in an opening learning travel by switching on a door motor coupled to the door leaf and accelerating the door leaf from a closed position to a predetermined opening speed, and switching the door motor off at said predetermined opening speed;

b) detecting and storing a first speed and a first travel point of the door leaf at a beginning of a first test section and a second speed and a second travel point at an end of said first test section, said first test section beginning after the door motor is switched off;

c) switching on the door motor to open the door leaf completely;

d) moving the door leaf in a closing learning travel by switching on the door motor and accelerating the door leaf from an open position to a predetermined closing speed, and switching the door motor off at said predetermined closing speed;

e) detecting and storing a third speed and a first travel point of the door leaf at a beginning of a second test section and a fourth speed and a second travel point at an end of said second test section, said second test section beginning after the door motor is switched off, said beginning and said end of said first test section being said end and said beginning respectively of said second test section;

f) switching on the door motor to close the door leaf completely;

g) determining a first energy balance of the sliding door system wherein a kinetic energy at the beginning of said first test section is equal to a kinetic energy at the end of said first test section plus a frictional energy generated by movement of the door leaf through said first test section plus a potential energy gained by a closing weight connected to the door leaf by movement of the door leaf through said first test section;

h) determining a second energy balance of the sliding door system wherein a kinetic energy at the beginning of said second test section is equal to a kinetic energy at the end of said second test section plus a frictional energy generated by movement of the door leaf through said second test section minus a potential energy lost by the closing weight connected to the door leaf by movement of the door leaf through said second test section; and i) determining values for a dynamic mass and a mean frictional force for the sliding door system from said first and second energy balances.

10. An apparatus for operating a sliding elevator door, the door having at least one door leaf coupled to a door motor for driving the leaf between an open position and a closed position, a door drive including the door motor for controlling a driving force applied by the motor to the door leaf, an emergency closing device including a closing weight connected to the door leaf, the door drive including a microprocessor having an input, a tachometer coupled to the door motor for generating at an output pulses at a pulse frequency proportional to the speed of the door motor, the input of said microprocessor being connected to the output of the tachometer, the microprocessor having an output connected to the door motor for switching on and off the door motor, comprising:

a microprocessor for controlling a door motor coupled to a door leaf of a sliding door system, the door motor driving the door leaf between an open position and a closed position, said microprocessor having an input for receiving a door motor speed signal from a tachometer coupled to the door motor; and a memory in said microprocessor responsive to said door motor speed signal for storing values of speeds and distances associated with a learning travel of the door leaf through a test section between the open position and the closed position of the door leaf whereby said microprocessor determines a first energy balance of the sliding door system for travel through a first test section, determines a second energy balance of the sliding door system for travel through a second test section, and determines values for a dynamic mass and a mean frictional force for the sliding door system from said first and second energy balances.

11. The apparatus according to claim 10 wherein said first energy balance is a relationship that a kinetic energy at the beginning of said first test section is equal to a kinetic energy at the end of said first test section plus a frictional energy generated by movement of the door leaf through said first test section plus a potential energy gained by a closing weight connected to the door leaf by movement of the door leaf through said first test section and said second energy balance is a relationship that a kinetic energy at the beginning of said second test section is equal to a kinetic energy at the end of said second test section plus a frictional energy generated by movement of the door leaf through said second test section minus a potential energy lost by the closing weight connected to the door leaf by movement of the door leaf through said second test section.

12. The apparatus according to claim 10 wherein said memory stores a first speed at a beginning of a first test section, a second speed at an end of said first test section and a length of said first test section.

13. The apparatus according to claim 12 wherein said microprocessor controls the door motor in an opening learning travel by switching on the door motor to accelerate the door leaf to an opening speed, switching off the door motor before a beginning of travel through said first test section and switching on the door motor after an end of travel through said first test section to completely open the door leaf.

14. The apparatus according to claim 12 wherein said memory stores a third speed at a beginning of a second test section, a fourth speed at an end of said second test section and a length of said second test section.

15. The apparatus according to claim 14 wherein said microprocessor controls the door motor in an closing learning travel by switching on the door motor to accelerate the door leaf to a closing speed, switching off the door motor before a beginning of travel through said second test section and switching on the door motor after an end of travel through said second test section to completely close the door leaf.

* * * * *